Sept. 10, 1935.  J. A. DONAHOE  2,014,245
METHOD AND MEANS OF PRESERVING ICE AND THE LIKE
Filed July 6, 1934
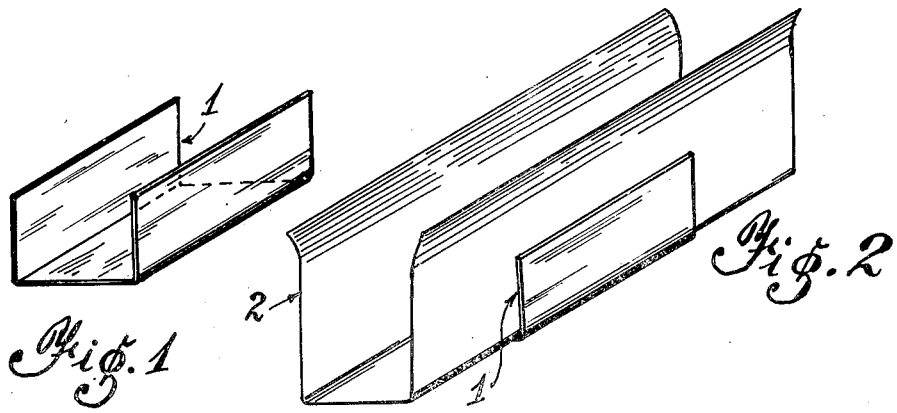
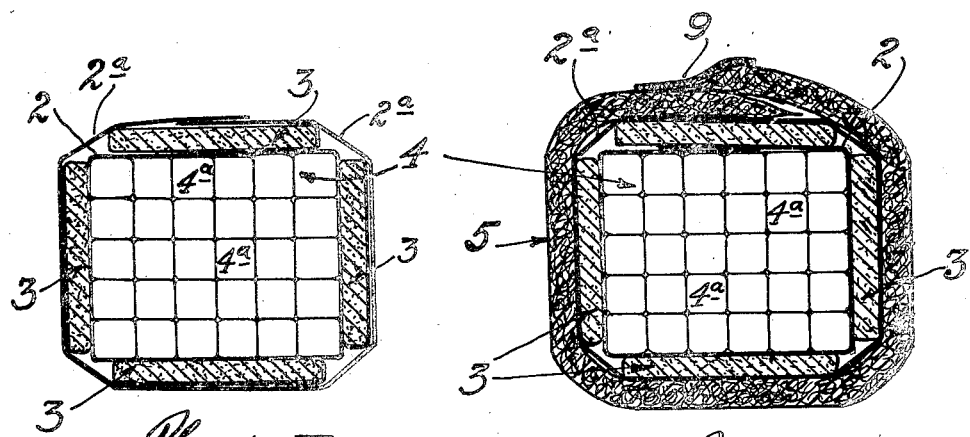
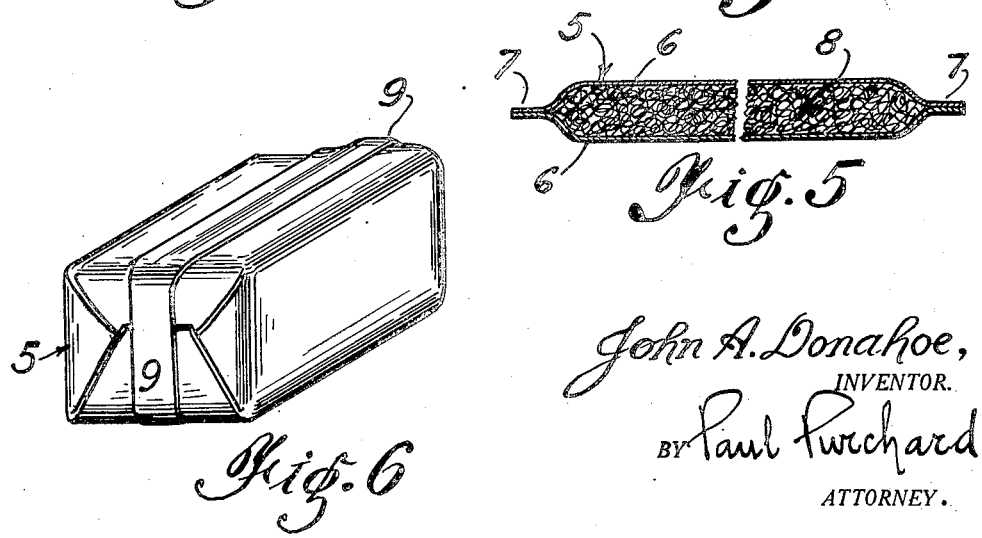
John A. Donahoe,
INVENTOR.
BY Paul Purchard.
ATTORNEY.

Patented Sept. 10, 1935

2,014,245

UNITED STATES PATENT OFFICE 2,014,245

METHOD AND MEANS OF PRESERVING ICE AND THE LIKE

John A. Donahoe, Pittsburgh, Pa., assignor to Donahoe's Inc., Pittsburgh, Pa., a corporation of Delaware Application July 6, 1934, Serial No. 734,003

3 Claims. (Cl. 62—91.5)

This invention relates to methods and means for preserving ice, and more in particular to the preservation of ice cut in small cubes and used domestically especially for making cold drinks, sherbets and other table delicacies.

The advent of mechanical refrigeration for domestic use has greatly developed the home consumption of ice-cooled drinks and all kinds of ice-cooled dishes, due to the fact that such mechanical refrigerators have been provided with special compartments wherein water may be frozen into, preferably, small cubes.

However, the ice making capacity of these domestic refrigerators is rather limited and the time required for the freezing process may extend over a period of several hours, so that there is often a shortage of ice in times of increased consumption, due to sickness, the arrival of unexpected social visitors, the presence of a larger number of guests than anticipated, or the temporary disability of the refrigerating mechanism, and so forth.

In such cases of emergency the owner of the refrigerator is generally compelled to supplement the available supply by purchasing additional cubes from an ice manufacturing plant.

Inasmuch as such plants are generally located in the industrial sections of a city, distant from the residential sections, it takes considerable time to deliver such ice-cubes and the latter are liable to reach the consumer in a state of considerable liquefaction, unless the conveyance in which they are delivered be provided with adequate refrigeration.

Moreover, once these ice-cubes are delivered to the hostess, she is generally not in position to make use of all of them at the same time, so that the remaining cubes will suffer additional shrinkage due to further melting, and they must be stored away in the refrigerator, in a special dish to collect the water.

In view of the fact that the retail sale of ice-cubes represents a rather infinitesimal part of the business of an ice manufacturing plant, and that the making of such cubes requires considerable additional work and machinery, the cost of making and delivering such cubes is very high, when considered in terms of tonnage, so that all losses in weight due to melting occasion appreciable financial losses which, of course, are borne by the ultimate buyer.

The purpose of this invention is to practically eliminate the above mentioned waste in cube-ice over a period of several hours which amount of time is generally more than ample to answer the temporary needs of a hostess, for instance.

This object is attained by packing the required number of ice-cubes, respectively weight of ice, with solidified carbon dioxide ($CO_2$), widely known in the trade under the name of "dry-ice", said carbon dioxide being preferably cut into slabs of suitable size and applied on a stack of ice-cubes, preferably on all side thereof.

The manner of packing the ice-cubes and the slabs of carbon dioxide is best illustrated in the drawing forming a part of this application, and in which:

Fig. 1 is a perspective vew of a metal form used for assembling the ice-cubes into a stack.

Fig. 2 is also a perspective view showing a wrapping sheet of water-proof paper used for first wrapping together the ice-cubes when formed into a stack.

Fig. 3 is a cross-sectional view showing the ice-cubes and the slabs of carbon dioxide enclosed in a second wrapper of waterproof paper.

Fig. 4 shows in cross-section a parcel of ice-cubes wrapped in an outer wrapper which possesses thermic insulating properties.

Fig. 5 is a cross-section through the insulating, outer, wrapper used preferably in connection with this invention.

Fig. 6 shows a perspective view of a parcel of ice-cubes, refrigerated and insulated, ready to be put in a paper bag for delivery to the buyer.

Reference being had to the drawing, the number of individual ice-cubes 4ᵃ required to produce approximately the desired weight of ice are assembled compactly to form a parallelopipedal or cuboidal stack 4 in the metal form 1, the inside of which has been lined with one or more thicknesses of any suitable waterproof paper 2 having preferably a vegetal oil base. It is also preferable that this paper be colored so that any torn particles thereof adhering to the ice may be readily noticed.

Upon its completion, the stack 4 is wrapped in the paper lining and lifted out of the form to be deposited on a work bench or table. Slabs 3 of solidified carbon dioxide are placed against some or all the sides of the stack, and a second wrapper of waterproof paper 2ᵃ is preferably used to hold the slabs of carbon dioxide in place. These two wrappers are tightly folded over the stack in such a manner as to form practically leak-proof pockets or containers capable of retaining the water resulting from the melting of the ice, should the latter be exposed to outside temperature for a longer period than warranted by the amount of carbon dioxide used in connection therewith.

The outer wrapper 5 has two purposes, namely that of an additional wrapper to protect the inner wrappers against injury and that of a thermic insulating covering to protect the ice against outside heat and to greatly retard the outward radiation of the intense cold temperature created by the gradual dissolution of the carbon dioxide.

This outer wrapper could be made of any one of many available flexible materials, such as loosely woven vegetable fibre, felt, or corrugated cardboard; but I prefer to use a special pad made entirely of paper, on account of its relatively great insulating properties, flexibility and moderate cost of manufacture.

As shown in particular in Fig. 5, this insulating wrapper 5 is made up of two sheets 6 of suitable paper, secured together marginally either by glueing or sewing, as suggested at 7, thereby producing a flat hollow container which is filled to the desired thickness with a loose filling 8 obtained preferably by minutely shredding cheaper grades of paper, or old newspapers.

The outer wrapper, once applied around the stack of ice-cubes, is held in its folded position either by means of strings or, preferably, by means of a strip of adhesive tape 9, as shown in Fig. 6.

A suitable amount of fully wrapped packages of ice-cubes are prepared in advance and kept in cold storage for a limited time until sold, in which case they are delivered to the buyers in ordinary paper-bags (not shown). These bags facilitate the carrying of the ice-cubes and serve as additional thermic insulation. Moreover, they enable the persons carrying the packages to hold same at a distance from the body to guard themselves against the intense cold of the frozen carbon dioxide and also against so-called carbon dioxide burns.

In practice I have found that by wrapping a stack of ice-cubes as above described and using, by weight, approximately one-fifth to one-quarter as much solidified carbon dioxide as of ice, a stack of ice-cubes of the size usually ordered by the trade may be safely kept for at least six hours and that the ice during this time will show no signs of melting but, on the contrary, will become even colder and harder than it was at the time when first packed, owing to the very low temperature of the solidified carbon dioxide.

Of course, by increasing the amount of carbon dioxide used in proportion to the weight of ice, the latter may be preserved practically for any length of time, owing to the very slow rate of dissolution of the carbon dioxide when protected by an insulating wrapper, as above described.

Therefore, ice-cubes protected in this manner are made available for a period of many hours of exposure to the outside temperature and for many varied purposes, such as sick-room uses, for picnics at distant and isolated places and for the preparation at all times and places of cooled drinks by persons possessing no mechanical refrigerators.

If desired, the ice-cubes may be flavored or colored in any desired manner to satisfy the requirements of the trade, for direct use in cooling drinks or to achieve artistic effects in the culinary and other arts. Such flavoring or coloring do not affect adversely the length of time during which the ice-cubes may be preserved without melting.

To the best of my knowledge and belief, the above described method of preserving and marketing ice is novel, and extensive experiments over a considerable period of time have proven that this method is commercially practical.

In its broader aspect my invention may be considered as relating to a new method and means for preserving a liquefying refrigerant, ice in particular, by means of another solid refrigerant which dissolves into a gas during its refrigerating action, solidified carbon dioxide in particular. While in the appended claims these particular elements may be specifically mentioned, I wish to include in this application all such suitable elements which liquefy or gasify when passing from their frozen state into their normal state.

Concerning the wrapping of the stack of ice-cubes, there may be slight changes made in the construction and arrangement of the details of my invention without departing from the field and scope of the same, and I intend to include all such variations as fall within the scope of the appended claims, in this application in which the preferred form only of my invention has been disclosed.

I claim:—

1. As an article of manufacture, a package of ice comprising a plurality of ice-cubes closely stacked together to form a composite body of substantially parallelipipedal form; a first wrapper of waterproof material surrounding said body; a plurality of slabs of solidified carbon dioxide positioned against said wrapper on the sides of said body; a second wrapper of waterproof material placed against said slabs and completely enclosing said body and slabs, and an outer foldable and sheet-like thermic insulating cover completely surrounding said second wrapper.

2. As an article of manufacture, a package of ice comprising a plurality of ice-cubes closely stacked together to form a composite body of substantially parallelipipedal form; a first wrapper of waterproof paper surrounding said body; a plurality of slabs of solidified carbon dioxide positioned against said wrapper and on several sides of said body; a second wrapper of waterproof paper placed against said slabs and completely enclosing said body and slabs, and an outer foldable and sheet-like thermic insulating cover completely surrounding said second wrapper.

3. As an article of manufacture, a package of ice comprising a plurality of ice cubes closely stacked together to form a composite body of substantially parallelipipedal form; a first wrapper of waterproof paper surrounding said body; a plurality of slabs of solidified carbon dioxide positioned against said wrapper and on several sides of said body; a second wrapper of waterproof paper placed against said slabs and completely enclosing said body and slabs; an outer foldable and sheet-like thermic insulating cover completely surrounding said second wrapper, and means to hold said insulating cover in folded position.

JOHN A. DONAHOE.